*S. Garber,*
*Nut Lock,*
*N° 79,649.*  *Patented July 7, 1868.*
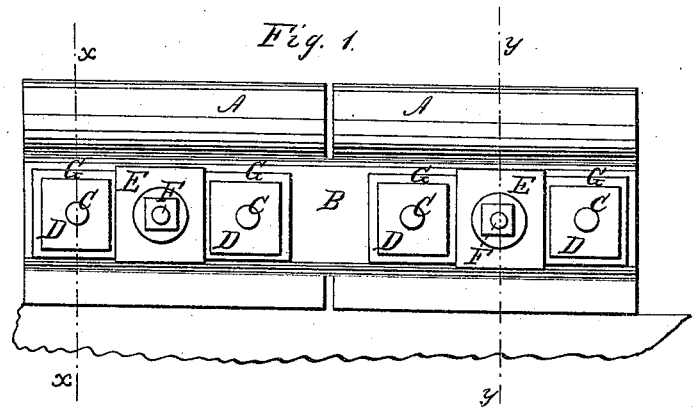
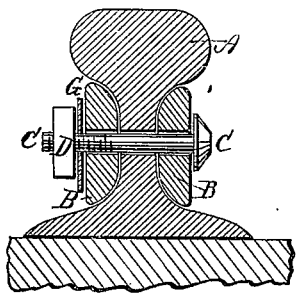 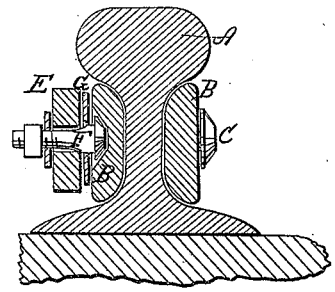
Witnesses;
H. C. Ashketter
Wm. A. Morgan
Inventor;
Samuel Garber
per Munn & Co.
Attorneys

United States Patent Office.

SAMUEL GARBER, OF BEAVER, PENNSYLVANIA.

Letters Patent No. 79,649, dated July 7, 1868.

IMPROVEMENT IN LOCK-NUTS.

*The Schedule referred to in these Letters Patent and making part of the same.*

TO ALL WHOM IT MAY CONCERN:

Be it known that I, SAMUEL GARBER, of Beaver, in the county of Beaver, and State of Pennsylvania, have invented a new and useful Improvement in Locking-Nuts; and I do hereby declare that the following is a full, clear, and exact description thereof, which will enable others skilled in the art to make and use the same, reference being had to the accompanying drawings, forming part of this specification, in which—

Figure 1 is a side view of the adjacent ends of two contiguous rails of a railroad-track, illustrating my invention.

Figure 2 is a vertical cross-section of the same, taken through the line $x\ x$, fig. 1.

Figure 3 is a vertical cross-section of the same, taken through the line $y\ y$, fig. 1.

Similar letters of reference indicate corresponding parts.

My invention has for its object to furnish a simple and effective means for keeping nuts upon bolts that are subject to a frequent or continuous jarring, designed especially for securing the nuts upon the bolts that hold the fish-plates to the sides of the rails of railroad-tracks, but which are equally applicable to nuts upon bolts in other situations; and it consists in the lock-piece or block, placed between the nuts to be locked, and held in place by a rivet-headed nail or screw passing through said block, and a piece or plate behind it, as hereinafter more fully described.

A are the adjacent ends of two contiguous rails, which are held in place, and in connection with each other, by the fish-plates B.

The fish-plates B are held in place, upon the sides of the rails A, by the bolts C, which pass through them and through the body of the rails A, and upon the ends of which are screwed the nuts D.

E are the locking-pieces or blocks, which are made of wood or other suitable material, and which are made of such a size as to fit into the space between the opposite sides of the two adjacent nuts, D, to be locked. The locking-piece or block E is held in place by the rivet-headed nail or screw F. The screw or nail F may pass through the fish-plate B, its head being between the said fish-plate and the side of the rail A, and should have a small nut screwed upon its outer end, said outer end being slightly riveted down upon the said nut. In case old fish-plates are used, a piece or plate, G, of wrought or cast iron may be placed upon the outer side of the fish-plate, through which the bolts C pass, and through which the nail or screw F passes, the head of said nail or screw being between the said plate G and the outer side of the fish-plate B, as shown in fig. 3.

Having described my invention, I claim as new, and desire to secure by Letters Patent—

The lock-block E, placed between two adjacent nuts, D, outside the fish-plates, and held in position by means of the perforated or recessed fish-plates B, or metal strip G, and the reversed bolt and nut F, all arranged and operating as described, for the purpose specified.

The above specification of my invention signed by me, this first day of February, 1868.

SAMUEL GARBER.

Witnesses:
I. M. HUNTER,
DAVID GARBER, Jr.